United States Patent [19]

Blohm et al.

[11] Patent Number: 5,281,686
[45] Date of Patent: Jan. 25, 1994

[54] METHOD FOR MAKING SILICONE-POLYPHENYLENE ETHER GRAFT COPOLYMERS AND PRODUCTS

[75] Inventors: Margaret L. Blohm; Judith Stein, both of Schenectady, N.Y.

[73] Assignee: General Electric Company, Schenectady, N.Y.

[21] Appl. No.: 985,774

[22] Filed: Dec. 4, 1992

Related U.S. Application Data

[63] Continuation of Ser. No. 705,216, May 24, 1991, abandoned.

[51] Int. Cl.$^5$ .............................................. C08G 77/06
[52] U.S. Cl. ........................................ 528/25; 528/29; 556/449
[58] Field of Search ................. 528/15, 25, 29; 525/474, 393; 556/449

[56] References Cited

U.S. PATENT DOCUMENTS

| | | | |
|---|---|---|---|
| 3,419,635 | 12/1968 | Vaughn, Jr. ............... | 528/29 |
| 3,522,326 | 7/1970 | Bostick et al. ............ | 525/393 |
| 3,579,467 | 5/1971 | Brown, Jr. ................ | 556/449 |
| 4,686,131 | 8/1987 | Sugio et al. .............. | 428/158 |
| 5,025,074 | 6/1991 | Davis et al. .............. | 528/15 |

FOREIGN PATENT DOCUMENTS

| | | |
|---|---|---|
| 0240095 | 10/1987 | European Pat. Off. . |
| 0318698 | 6/1989 | European Pat. Off. . |
| 0433746 | 6/1991 | European Pat. Off. . |
| 1252214 | 11/1986 | Japan . |
| 2-250884 | 10/1990 | Japan . |
| 1232394 | 5/1971 | United Kingdom . |

OTHER PUBLICATIONS

Chemical Abstract, vol. 108, No. 22, May 30, 1988, abstract No. 187389x & Polymer Bulletin vol. 19, No. 2, 1988, Heidelberg de pp. 103–110, R. D. Allen et al, Synthesis and Properties of Xylene Ether–Dimethylsiloxane Triblock Polymers.

*Primary Examiner*—Ralph H. Dean
*Attorney, Agent, or Firm*—William A. Teoli; William H. Pittman

[57] ABSTRACT

A method is provided for making silicone-polyphenylene ether graft copolymers by oxidatively coupling a 2,6-dialkylphenol to a monophenol substituted organopolysiloxane macromer which can be prepared by the hydrosilylation of a phenol having a nuclear bound aliphatically unsaturated radical and a monohydrogen organosiloxane.

6 Claims, No Drawings

METHOD FOR MAKING SILICONE-POLYPHENYLENE ETHER GRAFT COPOLYMERS AND PRODUCTS

This application is a continuation of application Ser. No. 07/705,216, filed May 24, 1991, now abandoned.

BACKGROUND OF THE INVENTION

The present invention relates to the method for making silicone-polyphenylene graft copolymers by oxidatively coupling a 2,6-dialkylphenol to a monophenol substituted organopolysiloxane macromer. The monophenol substituted organopolysiloxane macromer can be prepared by the hydrosilylation of a phenol having a nuclear bound aliphatically unsaturated radical and a particular monohydrogen organosiloxane.

Prior to the present invention, as shown by copending application, Ser. No. 07/455,122, filed Dec. 22, 1989, silicone-polyphenylene ether graft copolymers were prepared by oxidatively coupling a 2,6-diorganophenol having the formula,

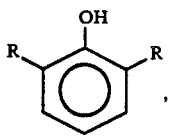
(1)

to a phenol-siloxane macromer having the formula,

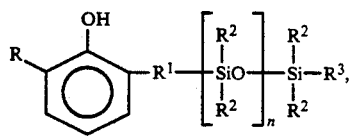
(2)

where R is selected from a halogen radical, or the same or different $C_{(1-13)}$ monovalent Organic radicals, $R^1$ is a $C_{(2-20)}$ divalent organic radical, $R^2$ is selected from the same or different $C_{(1-13)}$ monovalent organic radicals, $R^3$ is a $C_{(1-13)}$ monovalent organic radical and n is an integer equal to 1 to 100 inclusive. It has been found that the silicone-polyphenylene ether graft copolymer exhibits outstanding flame retardance and can be employed as a high performance injection moldable thermoplastic.

The phenol-siloxane macromer of Formula 2 can be made by a hydrosilylation addition reaction between an aliphatically unsaturated phenol having the formula,

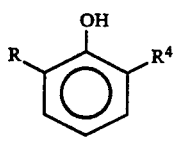
(3)

and a hydride terminated polydiorganosiloxane having the formula,

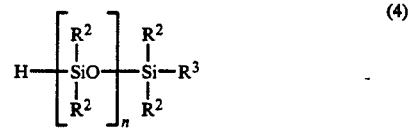
(4)

where R, $R^2$, $R^3$ and n are as previously defined and $R^4$ is an aliphatically unsaturated $C_{(2-20)}$ organic radical. The addition between the aliphatically unsaturated phenol of formula (3), and the silicone hydride of formula (4) can be effected with an effective amount of a platinum group metal catalyst, such as platinum.

Radicals included within R of formulas 1 and 2 are, for example, halogen, such as chloro or bormo, $C_{(1-8)}$ alkyl radicals, such as, methyl, ethyl, propyl and butyl; aryl radicals, such as phenyl, tolyl, xylyl; haloaryl radicals, such as chlorophenyl. Radicals included within $R^1$ are, for example, $C_{(2-20)}$ polyalkylene, such as polymethylene, and arylenealkylene, such as phenylenemethylene. Radicals included within $R^2$, are the same or different radicals included within R. In addition, $R^2$ can be selected from trifluoropropyl, cyanoethyl and cyanopropyl. Radicals included within $R^3$ are, for example $C_{(1-8)}$ alkyl such as methyl, ethyl, propyl and butyl and $C_{(6-13)}$ aryl, such as phenyl, tolyl and xylyl.

As shown by Ser. No. 07/455,122 the silicone hydride of formula (4) was made by initially lithiating a cyclic diorganosiloxane, such as hexamethyltrisiloxane, with an organollithium compound, for example, butyllithium or phenyllithium. The anionic ring opening polymerization of the cyclic trisiloxane has to be conducted under anhydrous conditions.

An alternate route to making monofunctional silicone hydride organosiloxanes of formula (4) is by equilibrating cyclic polydiorganosiloxanes, such as hexaorganotrisiloxane, or octaorganotetrasiloxane with a pentaorgano hydrogensiloxane chainstopper. However, the equilibration route results in the production of a mixture of the desired monofunctional end stopped hydrogen polydiorganosiloxane, as well as polydiorganosiloxane chain terminated with hydride siloxy units on both ends and polydiorganosiloxane free of hydride siloxy end stopped units. Accordingly, if the equilibration mixture containing the desired monofunctional end stopped polydiorganosiloxane along with the other unwanted reaction products is used to make phenol-polyorganosiloxane macromer, as well as silicone-polyphenylene ether graft copolymer by oxidative coupling, a build-up of unreacted polydiorganosiloxane and crosslinked reaction products can result.

SUMMARY OF THE INVENTION

The present invention is based on the discovery that bis(triorganosiloxy)organosilane having the formula,

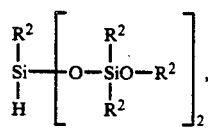
(5)

can provide monofunctional hydride siloxane exclusively when equilibrated with cyclic polydiorganosiloxane of the formula,

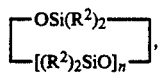

where $R^2$ is as previously defined and n is an integer equal to 2-6 inclusive.

Monofunctional hydride siloxane which can be made using the bis(triorganosiloxy)organosilane of formula (5), is included within the formula,

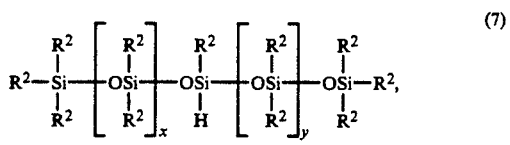

where $R^2$ is as previously defined and x and y are positive integers equal to 1 to 100 inclusive.

Phenol siloxane macromer having the formula,

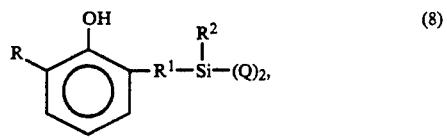

can be made by effecting a hydrosilylation addition reaction between an aliphatically unsaturated phenol of formula (3), and the monofunctional hydride siloxane of formula (7) where R, $R^1$, $R^2$ and $R^4$ are as previously defined, Q has the formula,

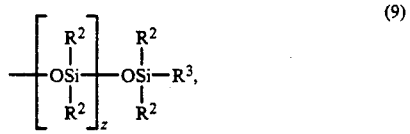

$R^3$ is a $C_{(1-13)}$ monovalent organic radical and z is x or y or an average value thereof.

It has been found that phenol siloxane macromer of formula (8), can be oxidatively coupled with 2,6-diorganophenol of formula (1) to produce flame retardant thermoplastic injection moldable graft copolymers, if there is used from 0.001 mole to 5 mole of the phenol siloxane macromer, per 100 moles of the 2,6-diorganophenol.

It is preferred however to use a macromer of formula (8) having Q groups where z is equal to 10 to 30, and from 0.1 to 0.5 mol of macromer, per 100 moles of 2,6-diorganophenol for optimum results. In instances where the oxidative coupling is effected with macromer outside of the aforementioned ranges, excessive crosslinking can result leading to gellation of the graft copolymer or the formation of incompatible unreactive silicone fluid.

Monohydric phenols, which are included within formula (1) are, for example, 2,6-dimethylphenol, 2,6-methylphenylphenol, 2,6-diphenylphenol, and 2,6-di-t-butylphenol, and 2,6-dibromophenol.

Aliphatically unsaturated monohydric phenols, which are included within formula (3), are, for example, 2-methyl-6-allylphenol, 2-phenyl-6-allylphenol, 2-bromo-6-allylphenol, 2-t-butoxy-6-allylphenol, 2-phenyl-6-ethenylphenol, and 2-methyl-6-propargylphenol.

The preferred silicone-polyphenylene ether graft copolymer, hereinafter referred to as the "graft copolymer" can be made by oxidatively coupling the 2,6-diorganophenol of formula (1), with the silicone macromer of formula (8).

The preferred oxidative coupling catalyst which can be used is an amine-basic cupric salt complex is shown by Hay, U.S. Pat. No. 3,306,874, in column 4, lines 38-61, and incorporated herein by reference. Effective oxidative coupling results also can be achieved with manganese and cobalt catalysts in addition to copper salts. Cuprous fluoride or cuprous bromide are the preferred copper salts. Suitable primary and secondary amines which can be used in making the catalyst are shown in column 4, lines 62-75, and column 5, lines 1-55, of U.S. Pat. No. 3,306,874, which is incorporated herein by reference. Included among these amines are dimethylbutylamine, dibutylamine and dibutylethylenediamine.

The graft copolymers of the present invention can be used as flame retardant high performance thermoplastics. It also has been found that the graft copolymers of the present invention can exhibit identical melt viscosities with Noryl resin which is a blend of polyphenylene ether and polystyrene. In addition, the graft copolymer of the present invention can satisfy UL94 V0 requirements when tested at 1/16", depending upon the mol % of the silicone macromer in the graft as compared to the mols of condensed arylene oxide resulting from the oxidative coupling of the monohydric phenol of formula (1).

Additional considerations include the silicone block length of the macromer which can contribute to an overall weight % value of silicone in the silicone macromer as well as in the graft copolymer. Optimum flame retardant properties with respect to a V0 rating, for example, can be achieved with the graft copolymer when there is employed a proportion of about 20 to 1000 mols of monohydric phenol, per mol of the silicone macromer during oxidative coupling. In addition, there can be added to the graft copolymer, various materials, such as, plasticizers, pigments and flame retardant additives.

The silicone macromer of formula (8) also can be used as a surfactant to facilitate the blending of organic and silicone materials under aqueous conditions. The silicone macromer also can be employed as a plasticizer or as a compatiblizer, for blends of silicone with other organic thermoplastic polymers.

In order that those skilled in the art will be better able to practice the present invention, the following examples are given by way of illustration and not by way of limitation. All parts are by weight.

EXAMPLE 1

Three drops of trifluoromethanesulfonic acid were added to a dry mixture of 43.6 g (147 mmol) of octamethylcyclotetrasiloxane and 1.09 g (4.90 mmol) of bis(trimethylsiloxy)methylsilane obtained from Huls America of Piscataway, N.J. The resulting mixture was stirred for 2 hours under ambient conditions in the substantial absence of moisture. The reaction mixture was then quenched with about 5 g of magnesium oxide and filtered. Based on method of preparation there was obtained a silicon hydride siloxane within the scope of formula (5). There was added to the silicon hydride siloxane, 0.87 g (5.88 mmol) of 2-allyl-6-methylphenol followed by 4 drops of a platinum vinyl disiloxane catalyst as shown by Karstedt, U.S. Pat. No. 3,775,452 and the resulting mixture was stirred for 2 hours. The resulting mixture was then heated to 150° C. under reduced pressure (0.1 torr) for 4 hours to effect the removal of unreacted phenol and low molecular weight siloxanes. Based on method of preparation there was obtained a 6-(polydimethylsiloxanepropyl)-2-methylphenol macromer having about 97% by weight of dimethylsiloxane and branches having an average chain length of 40 dimethylsiloxy units per branch.

There was added to a mixture of 2.5 g of 2,6-xylenol in 60 mL of toluene contained in a tube reactor, 1.23 mL of dimethylbutylamine, 0.25 mL of a 10% Adogen solution, a methyltrialkylammonium chloride surfactant (in toluene), 0.32 mL of dibutylamine, 0.125 mL of dibutylethylenediamine and 0.14 mL of cuprous bromide catalyst solution. The reactor was agitated with a Vibromixer equiped with a glass paddle. Oxygen was bubbled through the reaction medium at 0.5 standard cubic feet per hour. After 2 minutes there was added over a 20 minute period a solution of 22.0 g of 2,6-xylenol and 0.351 g of the above macromer and 70 mL of toluene. The reaction temperature was maintained between 30°–40° C. for approximately 45 minutes. The reaction mixture was then quenched with 5 mL of glacial acetic acid. The product was precipitated from the solution by addition of 3 volumes of absolute methanol and slurried for 15 min. A powder was obtained which was collected on a glass frit and washed repeatedly with 0.3 L portions of methanol. The product was then dried in an 80° C. vacuum oven for 14 hours. Based on method of preparation there was obtained a 92.5% yield of a silicone-polyphenylene ether graft copolymer in the form of a yellow powder having about 1.5 wt % siloxane. The above procedure was repeated to produce additional silicone-polyphenylene ether graft copolymers having an average "% Wt Silox" (siloxane) of between 0.75 to 6.6 based on the total weight of polyphenylene ether-methylsiloxane copolymer and the average siloxane chain length "CL Silox". These results are shown as follows:

TABLE 1

| CL Silox | % Wt Silox | IV | Mw | Mn | D | Tg C |
|---|---|---|---|---|---|---|
| 4.5 | 4.1 | 0.418 | 199989 | 21165 | 9.5 | 200.6 |
| 9.5 | 6.6 | 0.365 | 382490 | 21041 | 18.1 | 190.1 |
| 9.5 | 3.3 | 0.478 | 201058 | 27863 | 7.22 | 199.4 |
| 25 | 1.5 | 0.381 | 41513 | 18760 | 2.12 | 213.2 |
| 40 | 1.5 | 0.418 | 52900 | 26048 | 2.03 | 217.8 |
| 65 | 0.75 | 0.471 | 51456 | 27827 | 1.85 | 216.8 |
| 65 | 3 | 0.46 | 60979 | 32662 | 1.87 | 214.4 |
| 65 | 6 | 0.493 | 61776 | 32562 | 1.89 | — |

Five compression molded test bars (½"×1/16") of the above graft copolymers were molded at 250° C. for 1.5 minutes under 2 tons of pressure. The test bars are twice suspended over a ¾" Bunsen burner flame in accordance with UL-94 Bulletin of Jan. 24, 1980 for Flammability of Plastic Materials. A UL-94 V-O rating has the following criteria:

A. Not have any specimens which burn with flaming combustion for more than 10 seconds after either application of the test flame.

B. Not have a total flaming combustion time exceeding 50 seconds for the 10 flame applications for each set of five specimens.

C. Not have any specimens which burn with flaming or glowing combustion up to the holding clamp.

D. Not have any specimens which drip flaming particles that ignite dry absorbent surgical cotton located 12 inches (305 mm) below the test specimen.

E. Not have any specimens with glowing combustion which persists for more than 30 seconds after the second removal of the test flame.

The following results were obtained:

TABLE 2

| % Wt Silox | Ave FO (sec) | Range FOT (sec) | UL94 | Char Description Intumescence |
|---|---|---|---|---|
| 4.1 | 0.97 | 0.8–1.3 | VO | very large, spongy |
| 6.6 | 0.92 | 0.8–1.0 | VO | very large, spongy |
| 3.3 | 1.03 | 0.8–1.5 | VO | very large, spongy |
| 1.5 | 1.75 | 1.0–3.5 | VO | mod, spongy |
| 1.5 | 2.02 | 0.9–3.8 | VO | mod-large, spongy |
| 0.75 | 2.4 | 0.6–6.6 | VO | mod-large, spongy |
| 3 | 3.87 | 0.9–7.4 | VO | small, brittle |
| 6 | 6.38 | 1.8–13.8 | VI | small, brittle |

Although the above examples are directed to only a few of the very many variables which can be used in the practice of the present invention, it should be understood that the present invention is directed to a much broader variety of silicone-polyphenylene ether graft copolymers as set forth in the description preceding the example.

What is claimed is:

1. A method for making flame retardant silicone-polyphenylene ether graft copolymers which comprises, oxidatively coupling a 2,6-disubstituted phenol of the formula,

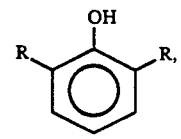

with a phenolsiloxane macromer of the formula,

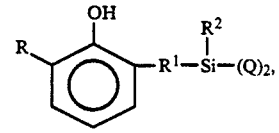

where R is selected from a halogen radical, or the same or different $C_{(1-13)}$ monovalent organic radicals, $R^1$ is a divalent $C_{(2-20)}$ organic radical, $R^2$ is selected from the same or different $C_{(1-13)}$ monovalent organic radicals, Q is

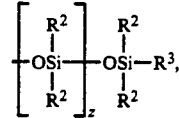

$R^3$ is a $C_{(1-13)}$ monovalent organic radical and z is an integer equal to from 1 to 100 inclusive.

2. A method in accordance with claim 1, where the 2,6-disubstituted phenol is a 2,6-dimethylphenol.

3. A method in accordance with claim 1, where $R^2$ and $R^3$ are methyl.

4. A method in accordance with claim 1, where $R^1$ is trimethylene.

5. A flame retardance silicone-polyphenylene ether graft copolymer made in accordance with the method of claim 1.

6. A flame retardant silicone-polyphenylene ether graft copolymer made in accordance with the method of claim 1, where R, $R^2$ and $R^3$ are methyl.

* * * * *